Jan. 21, 1930.  A. NEUBERT  1,744,665
EGG SEPARATOR
Filed Sept. 1, 1927  4 Sheets-Sheet 3
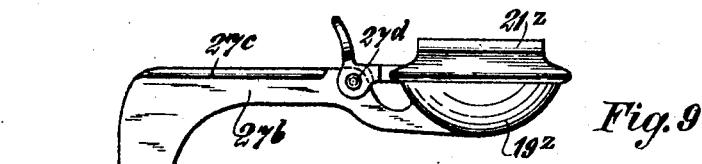
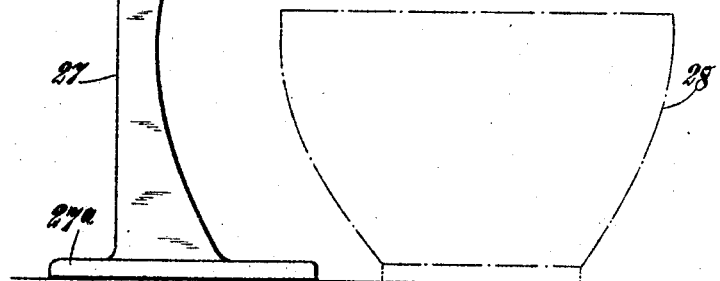
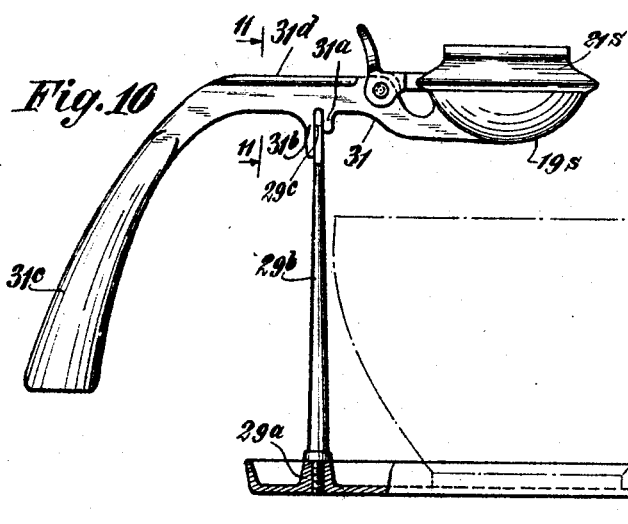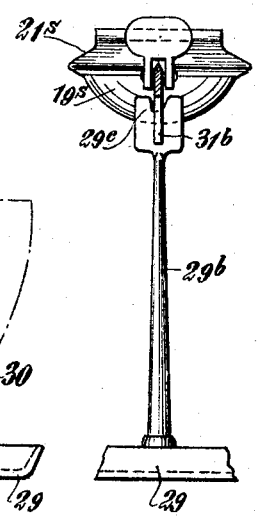
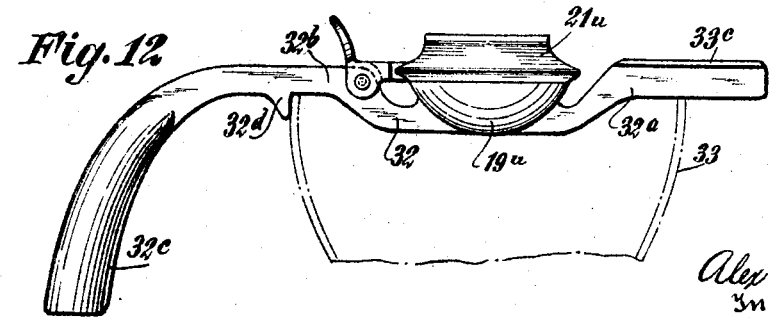
Alex Neubert
Inventor
By his attorney

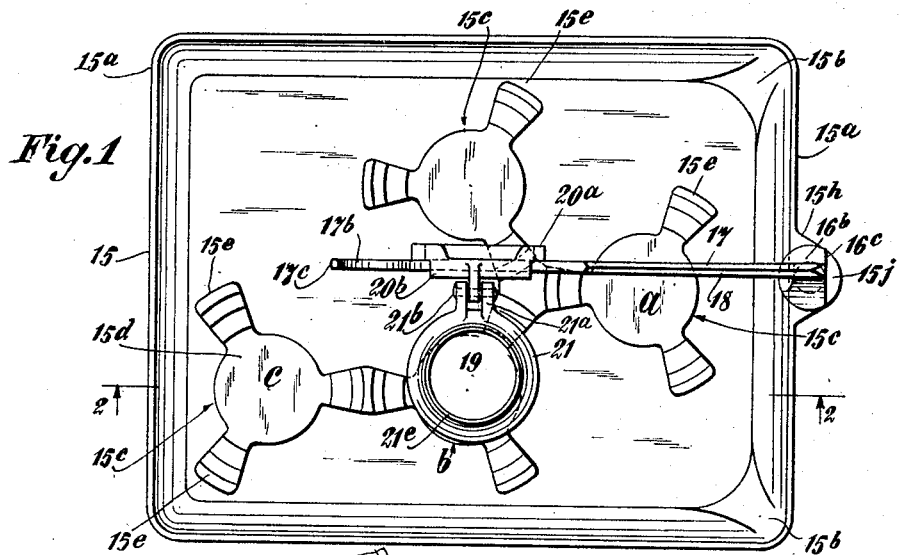

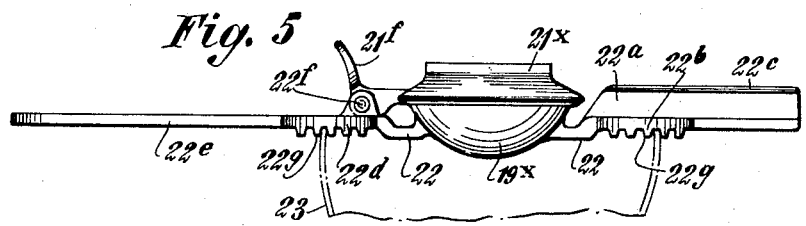
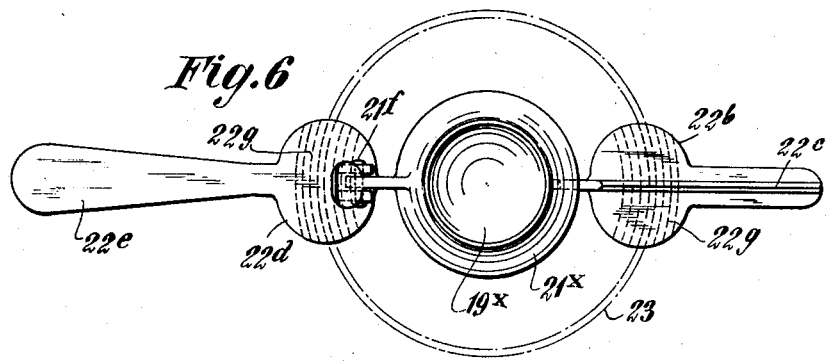
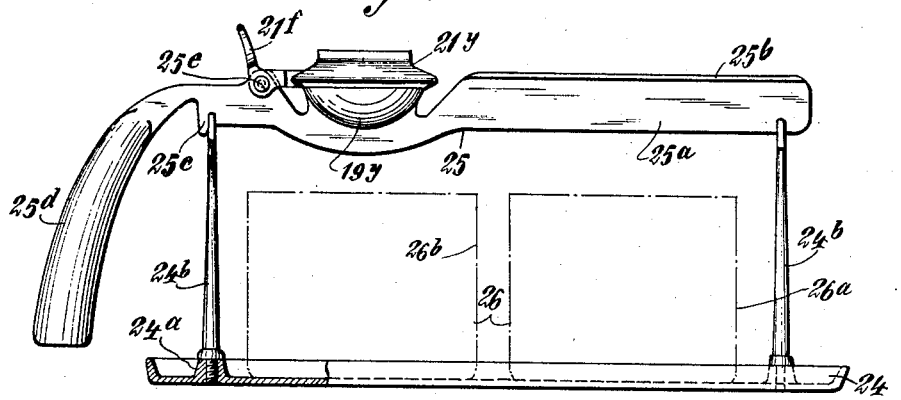
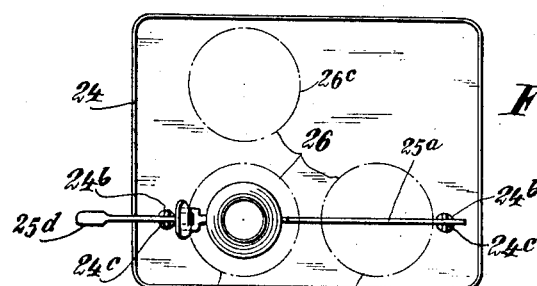

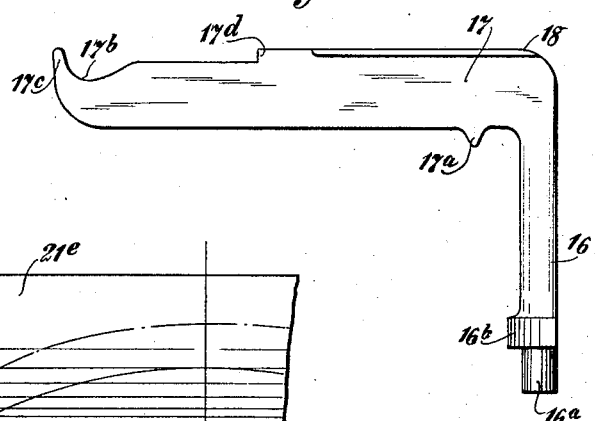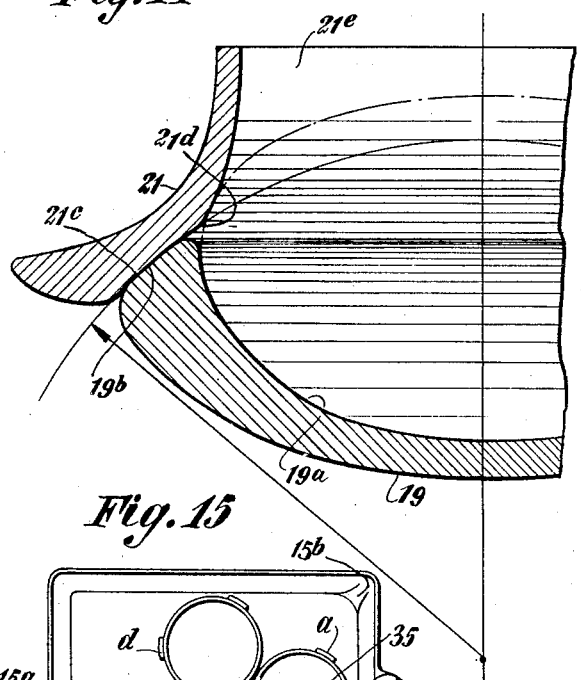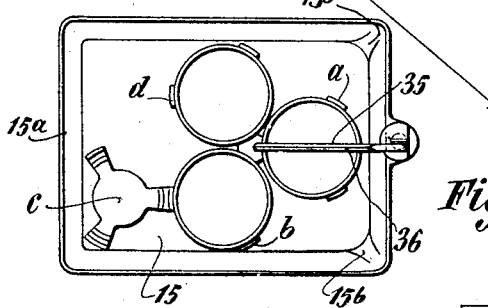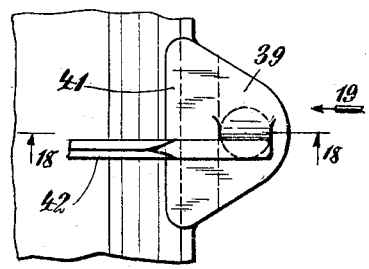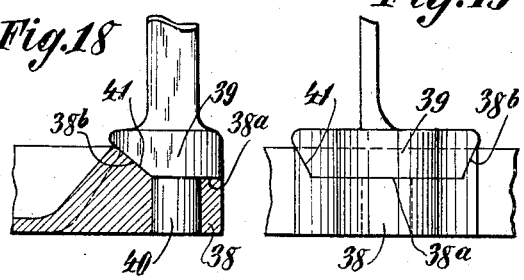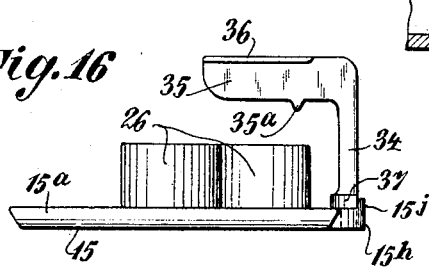

Patented Jan. 21, 1930

1,744,665

UNITED STATES PATENT OFFICE

ALEX NEUBERT, OF WICKATUNK, NEW JERSEY

EGG SEPARATOR

Application filed September 1, 1927. Serial No. 216,805.

This invention relates to egg separators.

One object of this invention is to provide a sanitary improved device for separating the white from the yolk of an egg, said device 5 comprising a yolk holder constructed so as to receive the yolk without breaking the membrane thereof, and to cause the white of the egg to flow away from the yolk rapidly, and to be separated by a cap having improved 10 coaction with the yolk holder.

A further object of this invention is to provide a device of the character described having among its improved features a sanitary tray of one-piece construction, a plural15 ity of cups on said tray to receive different portions of the egg and closely positioned with respect to each other in improved relation to the egg separating means, holders for the cups being provided on said tray to per20 mit the tray to be tipped to spill any dripping collected therein without disturbing said cups.

A further object of the invention is to provide an egg separator of the character 25 described, having a yolk holder and guide means slidably supporting said yolk holder, and facilitating the various movements of said yolk holder and the tipping thereof to discharge the yolk into the particular cup 30 set aside for that purpose.

A further object of the invention is to provide an improved mounting for a yolk holder whereby same can with facility be used in various different ways and for nu35 merous purposes.

With the foregoing and other objects in view the invention consists in the arrangement and combination of parts hereinafter described and claimed, and while the inven40 tion is not restricted to the exact details of construction disclosed or suggested herein, still for the purpose of illustrating a practical embodiment thereof reference is had to the accompanying drawings in which like 45 the accompanying drawings in which like reference characters designate the same parts in the several views, and in which—

Figure 1 is a plan view of an egg separator embodying the invention, the cups being removed.

Fig. 2 is a sectional view taken on the line 2—2 of Fig. 1 and showing in dotted lines the yoke holder in tipped position.

Fig. 3 is a sectional view of the yoke holder.

Fig. 4 is a rear elevation of the same.

Fig. 5 is a view in elevation of a modification mounted in operative position upon a cup shown in dotted lines.

Fig. 6 is a plan view of the same.

Fig. 7 is a view in elevation of a further modification of the invention, with parts in section.

Fig. 8 is a plan view on a reduced scale of the modification shown in Fig. 7.

Fig. 9 is a view in elevation of a further modification of the invention.

Fig. 10 is a modification of the invention illustrating an improved mounting for the yoke holder.

Fig. 11 is a fragmentary sectional view taken on the line 11—11 of Fig. 10.

Fig. 12 is a further modification embodying the invention.

Fig. 13 is a side elevation of the principal form of egg opening bracket.

Fig. 14 is an enlarged sectional detail of the yolk holder and separating cap.

Fig. 15 is a diagram in plan showing a modified arrangement of egg breaker and the cups pertaining thereto.

Fig. 16 is a side elevation of the structure of Fig. 15.

Fig. 17 is a fragmentary plan view of a modification of bracket and tray socket construction.

Fig. 18 is a vertical section of the same on the line 18—18 of Fig. 17.

Fig. 19 is a rear elevation as seen from the arrow 19.

In the practice of this invention, a sanitary tray is provided upon which are positioned a plurality of cups, one of which receives any dripping incident to the breaking of the egg shell on a knife mounted on the tray, while a second cup receives the white of the egg, and a third the yolk of the egg. Facilitating the operation of the device is a yolk holder slidably mounted so as to be movable over different cups, according as the white separated from the yolk is to be received in one cup and the yolk in another cup. The white is rapidly separated in an improved manner from the yolk, the device can in every respect be operated in an efficient manner, and sanitary conditions of the highest type are especially provided for.

Referring in detail to the drawings, 15 denotes a sanitary tray of one-piece construction, made of any suitable material, preferably rustless metal. Said tray is constructed so as to be comparatively free of any sharp angles so as to facilitate cleaning thereof, and a low rim portion $15^a$ is provided extending therearound at a suitable outward inclination. Said rim $15^a$ may be modified at any desired corners of the tray to form spouts $15^b$ or the like to permit drippings collected in the tray to be readily discharged through one of them on tipping the tray through a relatively slight angle without disturbing the cups. Of integral construction with the tray are a plurality of cup holders $15^c$ to hold cups of any conventional or standard type in predetermined position on the tray and prevent the same from moving or overturning when the tray is tipped. The said cup holders are molded, cast, or drawn with the tray, depending upon the material that is used, these terms being thus considered the equivalent of one another. In each case it results that the lines of junction of the cup holders with the tray are in the nature of outwardly directed curves that are readily cleaned. Preferably said cup holders each include a base portion $15^d$ from which extend in radial formation a plurality of supporting lugs $15^e$ each of which includes a guide $15^f$ to facilitate positioning of a cup in the seat $15^g$ of the lug. The bottom of each cup is thus raised above the bottom of the tray to prevent egg matter from adhering to the bottom of the cup. The cups are retained in relatively close compact position, and in improved predetermined relation to the egg separating means as will be described hereinafter. Each of the supporting lugs $15^e$ extends above the rim $15^a$ of the tray so that when the trays are stacked away one above the other, said lugs will cause the trays to be suitably separated to permit air to circulate therebetween, for rapid drying of the trays, and like purposes. The lugs are of stepped formation so that cups of different sizes may be retained thereby.

Detachably supported on the tray is a bracket 16 upon which is mounted the egg opening or breaking means. Preferably said bracket is engaged with an anchor lug or socket $15^h$ on the tray between the rear corners thereof and projecting outward of the rim $15^a$ of the tray. Said bracket has a downwardly extending pin $16^a$, while said anchor lug $15^h$ has an opening $15^i$ to receive said pin. Said anchor lug is likewise provided with a stop $15^j$, while the bracket 16 has a shoulder $16^b$ extending over and around said opening $15^i$ to prevent egg material from dripping thereinto, said shoulder being squared off at $16^c$ to coact with said stop to prevent the bracket form turning. It is thus seen that while the bracket is readily and freely attachable to and detachable from the tray, yet it provides an efficient and secure mounting for the egg separating means now to be described.

Extending forward from the bracket 16 and centrally over the tray 15 is a horizontal bar 17 having at its upper edge and adjacent to the bracket a knife edge 18 upon which the shell of the egg is broken. Drippings of the egg are caught in a cup positioned at $a$, while a projection $17^a$ on the lower edge of the bar 17 arrests any flow of the egg material along said bar so as to insure cleanliness of the bracket.

A yolk holder 19 is slidably mounted on the bar 17, and in its initial position on receiving the egg, over a cup positioned at $b$. Said yolk holder is supported by a bracket structure 20 slotted at $20^a$ to slidingly receive the bar 17. Preferably said bracket structure includes a plate $20^b$ movable along one side of said bar, and an open or ring member $20^c$ movable along the other side of said bar. The bracket is recessed at $20^d$ downward and toward the yolk holder for the purpose of guiding the white toward the receiving cup, and said recess is so shaped as to facilitate the drainage of the white into the cup. The bracket structure is thus seen to be of strong and integral construction with the yolk holder.

The yolk holder 19 is of novel and improved construction both to prevent the membrane of the yolk from breaking, and to cause the white to rapidly flow away and from under the yolk. For this purpose the interior surface $19^a$ of the yolk holder is suitably curved to conform to the shape of the yolk, and as shown in Fig. 14, is of saucer shape as distinguished from cup shape, the sides being sufficiently shallow and inclined toward the horizontal as to provide for the easy and direct slipping of the yolk therefrom when the yolk holder is tilted as in Fig. 2, dotted lines. The inner surface $19^a$ of the yolk holder is not spherical, but is materially flattened and may be described as being composed of a combination of curves to produce the effect above described and ready discharge of the yolk therefrom. It is to be noted also that all edges and surfaces of the separator mechanism are smooth and rounded so as to provide the utmost cleanliness, making the least possibility for the harboring of bacteria, and, secondly, to reduce to a minimum the likelihood of cutting or rupturing the delicate membrane surrounding the yolk.

The white is readily separated from the yolk to drip into the cup at $b$ by improved means that provides for durability of the egg separator. Said means 21 may consist of a ring structure or cap that is pivotally mounted by an arm $21^a$ on the bracket 20 at the pivot $21^b$. Said cap has a spherical female end $21^c$ to coact with and receive a spherical surface $19^b$ on the yolk holder 19, so as to provide an extended surface for squeezing the white loose from the yolk. The pivotal connection at $21^b$ is a loose one, $19^b$ and $21^c$ being coacting spherical segments, and hence the cap 21 is always self-centering upon the yolk holder. The extended surface contact thus provides for that high degree of durability which can never be obtained where sharp edges are used. The action in separating the white from the yolk is, however, efficient and rapid because of the accurate fit between the yolk holder and the cap due to the spherical segmentary construction of the separating or actuating surfaces.

The cap 21 is further so constructed as not to injure the membrane of the yolk, and for this purpose has an inner surface $21^d$ of well rounded smooth surface form and an upper tubular portion $21^e$ so that ample space is provided for an excessively large yolk.

After the white has been separated from the yolk, the yolk holder 19 is moved forward along the bar 17 toward the free end thereof, and tipped as shown in dotted lines in Fig. 2 at the concave guiding portion $17^b$ of said bar, the end tongue $17^c$ of the bar serving to limit the movement of the yolk holder along the bar. The yolk holder will now be directly above a cup at $c$, and the yolk on the tilting of the holder will be discharged thereinto. The yolk holder is then returned to its initial position above the cup at $b$, a stop $17^d$ on the bar 17 abutting the bracket 20 to limit the rearward movement thereof. See Fig. 13.

In Figs. 5 and 6 is shown a modification wherein a yolk holder $19^x$ and a cap $21^x$ embodying the invention are mounted on a bracket 22 that can be reliably supported on a cup or bowl 23 regardless of the size thereof. Said bracket includes a portion $22^a$ having a broad extension $22^b$ and is provided with a knife edge $22^c$ for breaking the egg shell. A diametrically opposite broad portion $22^d$ has an outwardly extending handle $22^e$, and on the portion $22^d$ the cap $21^x$ is pivotally mounted at $22^f$ and with the finger piece $21^f$ adjacent to said handle to be conveniently actuated by the hand of the operator for raising or lowering the cap. The broad portions prevent the device from accidental tilting on its supporting cup or bowl. To retain the yolk holder in central position over the cup 23, the lower edge of the bracket 22 is notched at $22^g$ to engage the rim of the cup, and prevent said bracket from moving along the cup. Since a plurality of notches are provided at each side of the bracket, the yolk holder can be readily used with cups of various sizes.

Figs. 7 and 8 illustrate a modification wherein a yolk holder $19^y$ and cap $21^y$ are used in conjunction with a tray 24 of simplified construction, and having lugs $24^a$ into which are threaded the upright supports $24^b$ that are slotted at $24^c$ to detachably receive a bracket 25 on which the yolk holder is mounted. Preferably said bracket 25 constitutes at one end thereof a bar $25^a$ having a knife edge $25^b$, while the other end of the bracket is provided with a stop or shoulder $25^c$ coacting with an adjacent support $24^b$ and a handle $25^d$. Said bracket 25 may be of integral construction with the yolk holder, while the cap is pivotally mounted thereon at $25^e$. Positioned on the tray are a plurality of receptacles 26 into which various parts of the egg are received and generally according to the manner hereinbefore described. These three cups, shown in dotted lines, are identified by the characters $a$, $b$, and $c$, the cup $26^a$ being located beneath the egg breaker knife edge $25^b$ so as to catch the drip therefrom, the cup $26^b$ is located beneath the separator to catch the white, and the cup $26^c$ is located at one side of the second mentioned cup so as to receive the yolk when the device is tilted upon its knife edge bearings $24^c$ in the upper ends of the supports $24^b$. For this purpose, the yolk holder is located preferably above the pivot line so that when the device is tilted, the yolk holder is carried over far enough to the side to deposit the yolk into the intended cup. The handle $25^d$ serves not only as a handle for the usual manipulation of the device while the operator's thumb may manipulate the short lever $21^f$ for opening the cap, but the form of the handle is such that it serves as a counter balance and tends to hold the device in the position illustrated.

Fig. 9 illustrates a modification wherein a yolk holder $19^z$ and a cap $21^z$ are arranged in a particularly simplified embodiment of the invention, a bracket 27 being provided having a base $27^a$ which may be enlarged to rest upon a table 28 or the like. Said bracket 27 has an upper laterally extending bar $27^b$ and a knife edge $27^c$ thereon. The yolk holder is shown of integral construction with the bracket, while the cap is pivotally mounted thereon at $27^d$. In this embodiment of the invention the bar 27$^b$ constitutes a cantilever that extends over the cup 28 and the relation of the cap and yolk holder to each other are the same throughout the different forms illustrated.

In Figs. 10 and 11 is shown a further modification of the invention wherein a tray 29 is provided for a cup or bowl 30, said tray having a lug 29$^a$ into which is threaded an upright support 29$^b$ for a bracket 31 on which is mounted the yolk holder 19$^s$ and cap 21$^s$. Preferably the support 29$^b$ is slotted at 29$^c$ to receive the bracket, while the latter has stops 31$^a$ and 31$^b$ to engage the support adjacent to the slot 29$^c$ to retain the bracket 31 in reliable but detachable or tiltable engagement with said support. Said bracket, which is of integral construction with the yolk holder, also includes a handle 31$^c$ and a knife edge egg breaker 31$^d$.

In Fig. 12 is shown a modification of the invention wherein a yolk holder 19$^u$ and a cap 21$^u$ are mounted on a bracket 32 which is supported on any cup or bowl 33. Said bracket includes a pair of laterally extending portions 32$^a$ and 32$^b$ resting on the rim of said cup, the former having a knife edge egg breaker 33$^c$, and the latter a stop or shoulder 32$^d$ and a handle 32$^e$ which extends downward so as to gravitationally balance the device and so maintain it normally in the position shown. Said device can thus be used with cups of various sizes and can be conveniently tilted thereon as may be desired for turning the yolk from its holder.

In the practice of this invention it is desirable at times to break eggs for storage and future sale and use without separating the yolks from the whites. For this purpose an arrangement as shown in Figs. 15 and 16 is employed with reference to the cups and design of the breaker. The tray is or may be the same as above described having the four seats $a$, $b$, $c$, and $d$ for cups, but preferably only three cups are used at any one time. The breaker comprises a bracket 34 having an integral bar 35 extending horizontally therefrom forward over the tray and provided with a knife edge 36 constituting the breaker. This knife edge is located over the cup in seat $a$ and other two cups are seated on the right and left sides of the plane of the breaker in the seats $b$ and $d$ and so in close proximity to the drip cup at $a$. Consequently when an egg is broken, it may be delivered from the shell with facility and with the least spilling of the material between the first cup and the cup that will receive it.

It will be observed that the bracket socket constituting an integral feature of the tray is shown in all the figures where it appears as located nearer to the rear left hand corner of the tray than the other rear corner. See especially Fig. 1. The reason for this design of the tray and socket is to bring the principal form of bracket and egg breaker materially to one side of the vertical central plane of the tray in order to bring the normal position of the yolk holder practically centrally over the second cup seat $b$. Moreover, as shown in Fig. 1, the vertical plane of the main portion of the bracket of the separator supporting bar is to the left of the center or axis of the socket 15$^1$ for the same purpose. In the practice of the invention as shown in Figs. 15 and 16, the short form of breaker is so designed as to lie in a vertical plane to the right of the axis of the base 37 whereby this form of the breaker is adapted for the same tray as above described and yet to insure the plane of the breaker being located over the first cup.

In the detail Figures 17, 18, and 19, I show a modification of tray socket 38, which instead of having a flat or vertical shoulder as shown at 15$^j$ is provided at its rear with a low cut horizontal face 38$^a$ and in the front adjacent to the rim of the tray it is beveled at 38$^b$. The bracket base 39 is correspondingly shaped so that when its pin 40 enters the socket, the two bevel faces 38$^b$ and 41 coming together will compel the self seating of the bracket in proper position, and consequently no matter how much disturbance may be imposed upon the tray and other devices in practice, the bracket will always stand upright and in proper position over the cups or cup seats. The forward portion of the base 39, the part having the bevel 41, is extended laterally from the vertical plane of the bracket and breaker 42, as shown in Fig. 17, thereby to better insure the shedding of the egg material toward the tray rather than toward the socket.

In all cases of the various forms of the device illustrated it will be understood that the manipulation of the separator or the means for separating the white from the yolk, is performed by manipulation of the cap 21. In other words, the cap is opened, especially in the preferred figures, by grasping it and swinging it upward to open position around the axis of the hinge 21$^b$. When the white is to be separated, the operator by movement of her hand will close the cap down over the yolk holder as already explained, and, in the form of Fig. 1, without releasing her hold on the separator she will draw it forward along the bar 17 to the dotted line position of Fig. 2, and then open the cap again for the delivery of the yolk. The final movement then is to return the separator to its original position against the stop shoulder 17$^d$, while the cap is still open and without releasing her hand from the cap.

I claim:

1. In a device of the character described, the combination of a yolk holder and a cap therefor having mating contact surfaces lying along the surface of an imaginary sphere, the cup and yolk holder having substantially universal engagement with each other.

2. A device of the character described, comprising a shallow sanitary tray, having a spout, said tray having a cup holder to detachably hold a cup and prevent the same from upsetting when the tray is tipped to discharge through the spout drippings of egg material collected in the tray, the cup holder having the bottom thereof in close proximity to the plane of the base of the tray, the top of the cup holder being substantially at the plane of the rim of the tray, a yolk holder, and means to support said yolk holder over the cup.

3. In an egg separator, the combination of a tray for a plurality of cups, a bracket mounted on the tray, a bar extending laterally from said bracket over said tray, a yolk holder slidably supported on said bar, and a cap for said yolk holder, said bar having guide and stop means for positioning the yolk holder over the different cups.

4. In an egg separator, the combination with a tray and a cup positioned thereon, of a bracket mounted on said tray, a bar extending laterally from said bracket over said tray, a yolk holder, a cap therefor, and movable means on the bar to tiltably support the yolk holder, said means having a slot to receive said bar, said bar having a downwardly concaved portion serving as a guide for the tilting action of said movable means.

5. In an egg separator, the combination of a tray having a cup holder for a cup, said tray having an anchor lug, a bracket detachably engaging said lug, an egg breaking knife on the bracket, stop means associated with said lug and said bracket to prevent the bracket normally from turning and to aline the knife with the cup holder, a yolk holder, a cap therefor, and means supporting the yolk holder on the bracket.

6. In an egg separator, the combination of a tray having a rim flange, a bracket mounted on the tray, a yolk holder supported by the bracket, a cap for said yolk holder, and a plurality of cup holders on the bottom of the tray, said cup holders supporting cups on the tray against overturning when the tray is tilted to discharge egg material therefrom, said cup holders consisting of spaced members between which the cups are seated, said members being integrally formed with the tray to prevent egg material from running thereunder.

7. In an egg separator, the combination of a yolk holder, a cap therefor, and a horizontal bar supporting the yolk holder, said bar having a knife edge upon which an egg can be neatly broken, and a projection at the lower edge of said bar remote from the yolk holder to arrest the flow of egg drippings along said bar.

8. In an egg separator, the combination of a yolk holder, a cap therefor, a tray, and a bracket supporting the yolk holder, said tray having a vertical opening, said bracket having a pin extending into said opening to detachably engage the bracket to the tray, and said bracket having a shoulder portion extending over and around said opening to prevent egg drippings from flowing thereinto.

9. In an egg separator, the combination of a yolk holder, a cap therefor, and substantially universal engagement means between the holder and the cap, said yolk holder and said cap having contact along a surface of spherical form to separate the white from the yolk and being self-centering due to said loose engagement.

10. In an egg separator, the combination of a yolk holder and a cap therefor, said yolk holder having an internal surface of flattened curved form to fit the yolk to cause rapid separation of the white from the yolk, and said cap being constructed to provide enlarged space above the yolk holder to accommodate yolks of different sizes, the cap having a lower opening registering with the yolk holder, and an upper opening smaller than the lower opening, said upper opening being considerably above the upper edge of the yolk holder and being connected with the lower opening by an inward extending surface.

11. In an egg separator, the combination of a yolk holder, a cap therefor, a tray for a cup, and means supporting the yolk holder on the tray, said yolk holder being movable on said means toward one end of the tray for tipping and discharging the yolk, said tray having a spout at an opposite end of the tray to permit egg material collected in said tray to be discharged on tipping the trap and without overturning the cup.

12. In an egg separator, the combination of a yolk holder, a cap therefor, a plurality of narrow lugs on the cap and yolk holder closely engaging each other, said lugs having holes to receive a pivot pin, the holes being so related to said pin in cross sectional area as to permit considerable movement of the cap at an angle to the pin, said cap and yolk having contact along a surface of spherical form to separate the white from the yolk and being self adjusting due to the pivot construction aforesaid to afford uniform contact with the yolk holder to separate the white from the yolk.

13. In an egg separator, the combination of a tray for a plurality of cups, a horizontal bar extending over the tray, a yolk holder slidably supported on the upper edge of said bar, and a cap for the yolk holder to separate the white from the yolk to be received in a cup, said bar having an upper edge portion thereof downwardly concaved, the concave portion forming a guide in which the yolk holder is tipped to deposit the yolk in another cup.

14. In an egg separator, a yolk holder, and freely mounted self-alining ring to uniformly seat on the yolk holder to separate the white from the yolk.

15. In an egg separator, a yolk holder, and freely mounted self-adjusting means to uniformly engage the yolk holder to separate the white from the yolk, said means including a member having an internal space communicating with that of the yolk holder and extending inward as to avoid injury to the membrane of the yolk at the line of coaction of the member with the yolk holder.

16. In an egg separator, a yolk holder, and self-adjusting means to uniformly engage the yolk holder to separate the white from the yolk, the aforesaid engagement being along a broad separating surface, as and for the purpose described and specified.

17. In an egg separator, a yolk holder, a self-adjusting means to uniformly engage the yolk holder to separate the white from the yolk, the aforesaid engagement being along a broad separating surface, as and for the purpose described and specified, the said means having an outward projecting portion adjacent to the said surface to permit the means to be lifted from the yolk holder.

18. In an egg separator, the combination of a tray, a yolk holder cast with the tray, a separator coacting therewith, a cup, a cup holder, the tray having a spout to permit drippings of egg therein to be discharged on tipping the tray, with the cup holder retaining the cup in position, the cup holder being constructed to permit a cup to seat in close proximity to the bottom of the tray.

19. A device of the character described, comprising a yolk holder and a cap therefor to separate the white from the yolk, said yolk holder and cap having mating contact surfaces lying along an imaginary sphere and loosely engaging each other in a substantially universal manner, the said surfaces being broad to squeeze the white loose from the yolk.

20. A device of the character described, including a tray, a knife edge for breaking an egg, and a yolk holder over the tray, and a plurality of cup holders on the tray, one of said cup holders being under the knife edge.

21. A device of the character described, including a tray, a single bracket at a side of the tray, an egg breaking knife on the bracket and extending therefrom over the tray, a yolk holder over the tray, a plurality of cup holders on the tray, one of said cup holders being under the said knife.

22. A device of the character described, including a tray, an egg breaking knife and a yolk holder over the tray, and a plurality of cup holders on the tray, the cup holders comprising portions joining the bottom of the tray to prevent egg material from running under the cup holders.

23. A device of the character described, comprising a tray, a knife and yolk holder over the tray, a plurality of cup holders on the tray, each of said cup holders having a large flat base portion on the tray above the bottom thereof and upstanding lugs to laterally support a cup, the said base portion having fluid tight connection along the edges thereof with the tray.

In testimony whereof I affix my signature.

ALEX NEUBERT.